Patented Jan. 4, 1927.

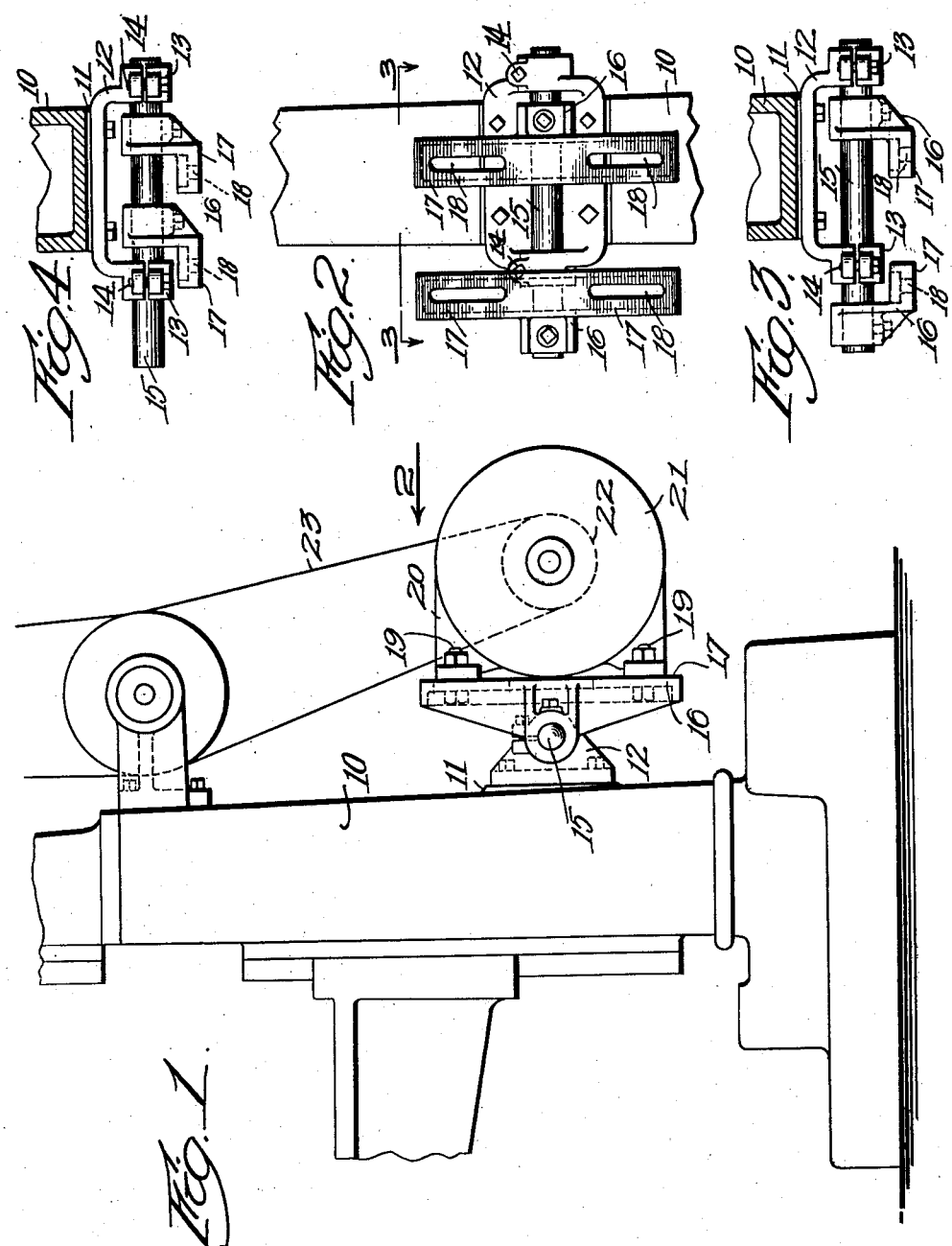

1,613,031

UNITED STATES PATENT OFFICE.

ALBERT J. GIFFORD, OF SHREWSBURY, MASSACHUSETTS, ASSIGNOR TO LELAND-GIFFORD COMPANY, A CORPORATION OF MASSACHUSETTS.

MOTOR SUPPORT.

Application filed February 24, 1925. Serial No. 11,229.

This invention relates to the attachment of a motor to a machine of any kind and the principal objects thereof are to provide an attaching means for the motor which can be used for motors of all makes and of various sizes; to provide a motor support mounted in such a way as initially to make the belt taut so that the support can be fixed in that position; and to provide simple and inexpensive means for mounting it.

Reference is to be had to the accompanying drawings, in which

Fig. 1 is a side view of a drill or other machine tool showing the driving belt and a motor mounted on it in accordance with this invention;

Fig. 2 is an edge view of the same showing the motor supporting device but with the motor removed;

Fig. 3 is a sectional view on the line 3—3 of Fig. 2 and

Fig. 4 is a similar view showing a different way of mounting a motor of different size or shape.

This invention is designed to be applied to any kind of a machine which is run by an individual motor. I have shown it applied to a machine frame 10 which is cast with a boss 11 thereon to which is secured a bracket 12 by means of bolts or the like. This bracket is provided with two hubs 13 spaced a convenient distance apart and having split bearings adapted to be secured together by bolts 14 for a supporting shaft 15 so that the shaft is free to turn. The shaft is provided with another pair of separate brackets 16 having bearings adapted to be secured to the shaft by set screws. These brackets are provided with faces 17 having slots 18 through which bolts 19 can be secured to mount a motor frame 20 thereon, this frame having feet through which these bolts 19 pass. One set of bearings can be fixedly secured to the shaft so that the motor support or frame 20 will be mounted on the shaft and capable of swinging about the axis of the shaft 15 as a center.

On the motor support 20 is mounted a motor 21 which has a driving pulley 22 for the driving belt 23 of the machine which extends upwardly therefrom. The shaft of the motor is located parallel with the shaft 15 and at a distance from it. In setting up, the weight of the motor hangs down on the belt and holds it taut so that the belt is tightened. Then the bolts 14 are screwed up to prevent the shaft from turning, and it is run that way.

In Fig. 4, I have shown the brackets 16 as mounted at other places on the shaft 15 to support a motor frame at a different point sideways or of a different size or shape. These brackets are removable and interchangeable and can be moved back and forth and turned end for end or adjusted in such ways as to enable the frame of any motor to come at the proper place for the pulley 22 to receive the belt 23.

This constitutes a very simple way of supporting the motor and provides for the use of any kind or size of motor without changing the mounting means, except to shift the brackets. It does away with all other belt tightening devices, so no mechanism is provided for tightening the belt that might get out of order.

Although I have illustrated and described only a single form of the invention, I am aware of the fact that it can be carried out in other forms by any person skilled in the art without departing from the scope of the invention as expressed in the claims. Therefore I do not wish to be limited to all the details of construction herein shown and described but what I do claim is:—

1. In a motor support, the combination with a pivot shaft, of a pair of brackets fixed thereto so as to be capable of swinging with the shaft, said brackets having their bearings for the shaft offset sideways and being capable of being adjusted or raised, each bracket having a supporting surface against which motors of different sizes and makes can be fixed to be supported on said shaft.

2. The combination with a machine frame, and a bracket fixedly carried on a vertical side thereof and having split bearings at a distance from said side, of a horizontal shaft mounted in said bearings and adapted to be fixed therein, a pair of brackets having bearings adapted to be tightened on said shaft, and a motor fixed to the pair of brackets with its shaft at a still greater distance from said side.

3. In a device of the character described, the combination with a machine frame, of a bracket fixed thereon having two bearings spaced apart, a shaft mounted in said bearings, a pair of brackets on said shaft having supporting surfaces, a frame fixed to the last named brackets and located substantially centrally with respect to said shaft and at the side thereof, a motor carried by said frame having a pulley, and a driving belt extending under the pulley.

4. In a device for driving a machine, the combination with a shaft or pivot having a horizontal axis and located in stationary position with respect to the machine, of a motor support pivoted on said shaft and capable of swinging about the same, a motor located on the support and having a transmitting pulley on its shaft for receiving the belt, said parts being located in such position that the two shafts are substantially at the same elevation, whereby the weight of the motor can be supported by the driving belt to adjust the tautness of said driving belt before the position of the motor is fixed and means for fixing the motor support.

In testimony whereof I have hereunto affixed my signature.

ALBERT J. GIFFORD.